United States Patent [19]
Ko et al.

[11] Patent Number: 5,365,281
[45] Date of Patent: * Nov. 15, 1994

[54] MOTION SIGNAL DETECTING CIRCUIT

[75] Inventors: Jung-Wan Ko, Lawrenceville, N.J.; Christopher H. Strolle, Glenside, Pa.

[73] Assignee: SamSung Electronics, Co., Ltd., Kyungki-do, Rep. of Korea

[*] Notice: The portion of the term of this patent subsequent to Jun. 14, 2011 has been disclaimed.

[21] Appl. No.: 903,942

[22] Filed: Jun. 26, 1992

[51] Int. Cl.$^5$ .................. H04N 9/64; H04N 7/18
[52] U.S. Cl. .................. 348/700; 348/701; 348/669
[58] Field of Search .......... 358/31, 105, 36, 37, 358/166, 167, 11, 12, 13, 310, 314, 328, 329, 330, 334, 141, 21 R, 16, 17; 348/699, 700, 701, 702, 450, 451, 452, 620, 667, 668, 669, 670; H04N 9/64

[56] References Cited

U.S. PATENT DOCUMENTS

| | | |
|---|---|---|
| 4,621,286 | 11/1986 | Reitmeier et al. . |
| 4,692,801 | 9/1987 | Ninomiya et al. ............ 358/105 |
| 4,772,961 | 9/1988 | Ichinoi . |
| 4,811,092 | 3/1989 | Achiha et al. ............ 358/105 |
| 4,831,463 | 5/1989 | Faroudja . |
| 4,868,650 | 9/1989 | Wechenbrock . |
| 4,972,259 | 11/1990 | Motoe et al. . |
| 4,982,271 | 1/1991 | Sugiyama et al. . |
| 5,031,030 | 7/1991 | Hurst, Jr. . |
| 5,063,457 | 11/1991 | Ishikawa et al. . |
| 5,083,203 | 1/1992 | Ko et al. ............ 358/105 |
| 5,113,262 | 5/1992 | Strolle et al. ............ 358/323 |
| 5,161,030 | 11/1992 | Song . |

OTHER PUBLICATIONS

Research Disclosure on "Video Signal Bandwidth Compression", No. 183, Jul. 1979, pp. 382–384. (disclosed anonymously).
Journal of British I.R.E. on "Reduction of Television Bandwidth by Frequency-Interlace", Feb. 1960, pp. 127–136, (disclosed by Howson and Bell).

*Primary Examiner*—James J. Groody
*Assistant Examiner*—Michael H. Lee
*Attorney, Agent, or Firm*—Robert E. Bushnell

[57] ABSTRACT

A motion signal detection circuit adapted to a video recording/reproducing apparatus having a frequency unfolding circuit for unfolding a luminance signal of a high frequency component included in the luminance signal of a low frequency component into an original frequency band, comprising a prefilter for eliminating the folding carrier and sidebands thereof included in the video signal unfolded by the frequency unfolding circuit, a comb filter for filtering the output of the prefilter to detect a motion signal, an error compensation circuit for compensating the errors included in the motion signal output from the comb filter.

12 Claims, 3 Drawing Sheets

MOTION SIGNAL DETECTING CIRCUIT

CROSS-REFERENCE TO RELATED APPLICATIONS

This application makes reference to our co-pending application entitled MOTION SIGNAL DETECTING CIRCUIT earlier filed in the United States Patent & Trademark office on Jun. 7, 1992 and assigned Ser. No. 07/711,981, and claims the benefits available therefrom under 35 U.S.C. §§119 and 120, which application, as amended, is hereby incorporated by reference into this specification.

BACKGROUND OF THE INVENTION

The present invention relates to a system for smoothing or spreading transitions between image regions included in television signals. The signals to be transmitted are processed in a still picture signal processing method and in a motion picture signal processing method. Particularly, the present invention is a circuit for accurately detecting a motion signal which represents a moving image so as to control the transitions between image regions of a frequency-unfolded image signal.

Standard television systems such as an NTSC or a PAL system, processes a television signal adaptively in accordance with an amount of motion in the signal. This adaptive processing of the signal may result in some quasi-motion picture regions between image regions being processed in a still picture signal processing method and other image regions being processed in a motion picture signal processing method. If differences in the processing methods are used, the different regions and the transition between them can be discerned by a viewer; therefore, image quality is degraded.

For example, for the purpose of separating chrominance and luminance components from a composite video signal, a frame comb filter or a line comb filter may be used. As long as there is no change in the image signal at frame time intervals, chrominance and luminance components from the composite video signal can be completely separated using the frame comb filter, the completely separated. If the scene changes, over the frame time intervals, then some color information will be present in the separated luminance component, and some brightness information will be present in the chrominance component.

A line comb filter, also used to separate the luminance and chrominance components from the composite video signal does not produce significantly degraded component signals in the presence of image motion. However, the line comb filter reduces the vertical resolution of the reproduced image in comparison with the frame comb filter. In addition, in locations where a vertical transition occurs, an image processed by the line comb filter may be degraded due to both color information introduced into the luminance component, producing an image artifact known as hanging dots and brightness information introduced into the chrominance, producing incorrect colors in the neighborhood of the transition.

Therefore the television signal is adaptively processed by detecting the presence or absence of image motion. In the regions in which the image is stationary, the frame comb filter is used, and in the regions in which the image is moving, the line comb filter is used.

Yet another example of such adaptive processing is an adaptive double-scanned, non-interlaced scan converter. In such a converter, inter-stitial lines are displayed between lines of the current field. The inter-stitial lines however, may be those transferred from the preceding field, in the presence of image changes producing visible artifacts such as serrated contours. The inter-stitial lines may also be interpolated from lines within the current field, but the vertical resolution is reduced and line flicker may occur. In regions in which image changes are detected, intrafield interpolated interstitial lines are displayed and field-delayed interstitial lines are displayed in other way.

Yet another example is an adaptive peaking circuitry in which regions having relatively high noise are processed with a relatively low peaking factor and regions having relatively low noise are processed with a relatively high peaking factor.

In the above examples, the television signals are processed adaptively in response to the values of estimated parameters of the image. The parameters are motion, in the case of luminance/chrominance separation and are double scanning non-interlaced conversion, and a relative level of noise, in the case of the peaking. Differently processed regions, and noticeable boundaries between regions where the parameter is present and those where it is absent are undesirable artifacts introduced by the above types of adaptive processing types.

U.S. patent application for the invention entitled "An Improved Video Signal Recording System" earlier filed in the United States Patent & Trademark Office on Aug. 17, 1990 by SamSung Electronics Co., Ltd., and duly assigned Ser. No. 07/569,029, describes a recording system for recording and reproducing a full bandwidth video signal on and from a recording medium having a limited bandwidth by folding the high frequency component of a luminance signal into the low frequency component of the luminance signal.

In the U.S. patent application Ser. No. 07/569029, a motion signal which represents a moving image is recorded together with the folded luminance signal and the chrominance signal on the recording medium. The motion signal is used to control the transition between regions of the full bandwidth luminance signal which is unfolded into the original frequency bands during reproduction.

In the inventions described in the foregoing paragraphs, the high frequency component of the luminance signal is folded into the low frequency component of the luminance signal in recording. At this time, the high frequency component of the luminance signal is modulated by a folding carrier, so that the folded luminance signal has a phase difference of 180 degrees between frames, between scanning lines, and between pixels.

Accordingly, in reproducing, the high frequency component folded into the low frequency component of the folded luminance signal is demodulated by the unfolding carrier having the same phase and frequency as those of the folding carrier, so that the high frequency component of the luminance signal is unfolded into the original frequency band.

However, the folding carrier and the side band thereof will be present in the unfolded luminance signal. The resultant luminance signa.1 unfolded by the folding carrier and the sidebands thereof has a phase difference of 180 degrees between frames.

As a result, the conventional motion signal detecting circuit, for detecting the level difference of pixels between frames as the motion signal, has difficulty detecting accurately the motion signal, from the unfolded luminance signal due to the phase off-set between frames.

The Korean patent application No. 90-18737 on the invention entitled "A Motion Signal Detecting Circuit", filed on Nov. 19, 1990, by Ko, describes techniques, for eliminating the folding carrier and sidebands thereof, contained in the unfolded luminance signal by a prefilter and for detecting a motion signal through filtering, by means of a comb filter, the unfolded luminance signal in which the folding carrier and the sidebands are eliminated.

This prefilter can however, eliminate the folding carrier and sidebands therefore contained in the unfolded luminance signal of the vertical and horizontal direction having a large correlation. It is difficult to completely eliminate the folding carrier and sidebands thereof contained in the unfolded luminance signal from the diagonal direction, that is, the temporal direction having a small correlation.

Therefore, since the unfolded luminance signal, which is output from the prefilter has a phase difference of 180 degrees by the folding carrier sidebands remaining in the diagonal signal component, it is difficult to derive an accurate value for the diagonal direction of the motion signal being the difference component between frames detected by the comb filter.

SUMMARY OF THE INVENTION

It is an object of the present invention to provide an improved process and circuit for detection of motion signals.

It is another object to provide a process and circuit enabling more accurate detection of motion signals.

It is still another object to provide a circuit for accurately detecting a motion signal which represents a moving image in a picture scene from the unfolded video signal.

These and other objects and features may be obtained according to the principles of the instant invention by providing a motion signal detecting process and circuit comprising:

an input line for inputting the unfolded video signal;
means for eliminating the folding carrier and sidebands thereof contained in the unfolded video signal and;
first comb filter means for detecting a motion signal which is the difference component of the unfolded video signal by filtering the output of the eliminating means; and
means for compensating errors contained in the motion signal detected by the first comb filter.

Alternatively, the principles of the invention disclosed may be practiced with a process and circuit for detecting motion in a video signal to generate a motion signal, said apparatus comprising:

first selecting means for detecting magnitudes of changes between a current value of said video signal and a first previous value of said video signal descriptive of a spatial location in the frame of said video signal two frames before said current frame that corresponds to said currently-scanned spatial location, and for generating a corresponding output signal descriptive of said magnitudes of changes between said current and first previous values of said video signal;

second detecting means for detecting at selected times magnitudes of changes between a current value of said video signal descriptive of a currently-scanned spatial location in a current frame of said video signal, and a second previous value of said video signal one frame before said current frame that corresponds to said currently-scanned spatial location, and for generating a corresponding output signal descriptive of said magnitudes of changes between said current and second previous values of said video signal;

electrically controlled switch means within said second detecting means, for selectively disabling the operation of said second detecting means and so causing the output signal of said second detecting means to assume a prescribed value;

means responsive to the output signal of said first detecting means for supplying said control signal; and means responsive to the output signal of said first detecting means, for supplying said motion signal.

BRIEF DESCRIPTION OF THE DRAWING

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
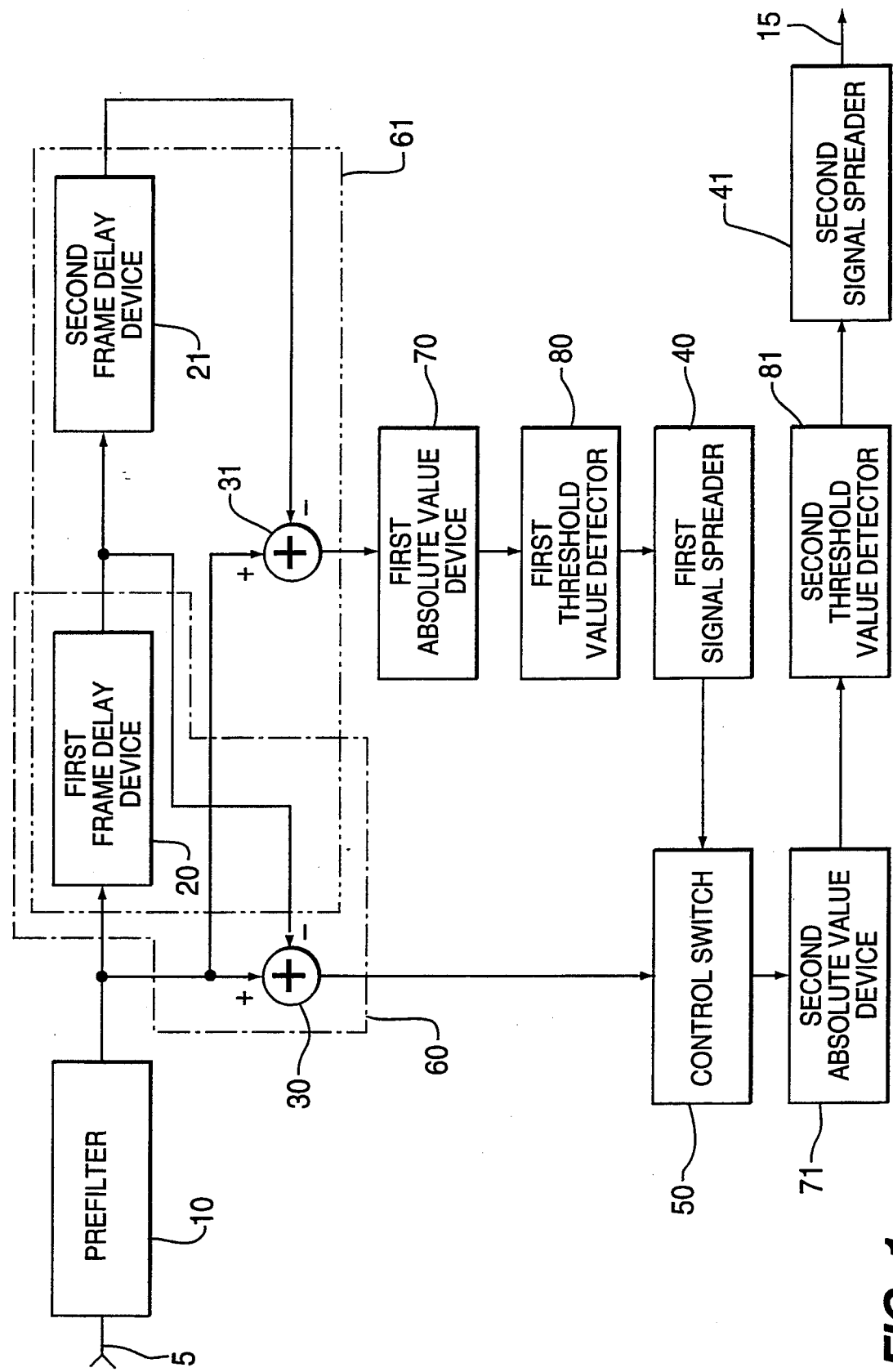
FIG. 1 is a block diagram of a preferred embodiment of a motion signal detecting circuit according to the invention.

Turning now to the drawings, and in particular to FIG. 1, an input line 5 is connected to the output of a frequency unfolding circuit (not shown) for the purpose of inputting the unfolded luminance signal and connected to the input of a prefilter 10. An output terminal of prefilter 10 is connected to an input terminal of a first frame delay device 20, a first input terminal of a first subtracter 30 and a first input terminal of a second subtracter 31. An output terminal of the first frame delay device 20 is connected to an input terminal of a second frame delay device 21 and a second input terminal of the first subtracter 30. An output terminal of the second frame delay device 21 is connected to the second input terminal of the second subtracter 31. An output terminal of the first subtracter 30 is connected to an input terminal of control switch 50. An output terminal of the second subtracter 31 is connected to an input terminal of a first absolute value device 70. An output terminal of the first absolute value (or magnitude) device 70 is connected to the input terminal of a first threshold value detector 80. An output terminal of the first threshold value detector 80 is coupled to the input terminal of a first signal spreader 40. An output terminal of the first signal spreader 40 is coupled to the control terminal of the control switch 50. An output terminal of the control switch 50 is connected to an input terminal of a second absolute value device 71. An output terminal of the second absolute value device 71 is coupled to an input terminal of a second threshold value detector 81. An output terminal of the second threshold value detector 81 is connected to an input terminal of a second signal spreader 41. An output terminal of the second signal spreader 41 is connected through an output line 15 to a control terminal of a soft switch (not shown) for mixing the spatially processed luminance signal with a temporarily processed luminance signal.

Here, a portion 60, including the first subtracter 30 and the first frame delay device 20, constitutes first comb filter circuitry, and a portion 61, including the second subtracter 31, first and second frame delay devices 20 and 21, constitutes second comb filter circuitry.

The unfolded luminance signal which is fed to the input line 5 includes the folding carrier and the sidebands.

In operation, the prefilter 10 eliminates the folding carrier and sidebands contained in the unfolded luminance signal by filtering the unfolded luminance signal being input through input line 5. The circuit diagram of the prefilter 10 is described in the Korean patent application number 90-17610, corresponding to the U.S. patent application Ser. No. 07/562,907, the invention entitled "An Improved Apparatus For Eliminating The Folding Carrier And Sidebands For The Unfolded Video Signal" earlier filed in the United States Patent & Trademark Office on Aug. 6, 1990, by Ko. et al. which may be desirably comprised of the circuit as shown in FIG. 2.

Figure 2:
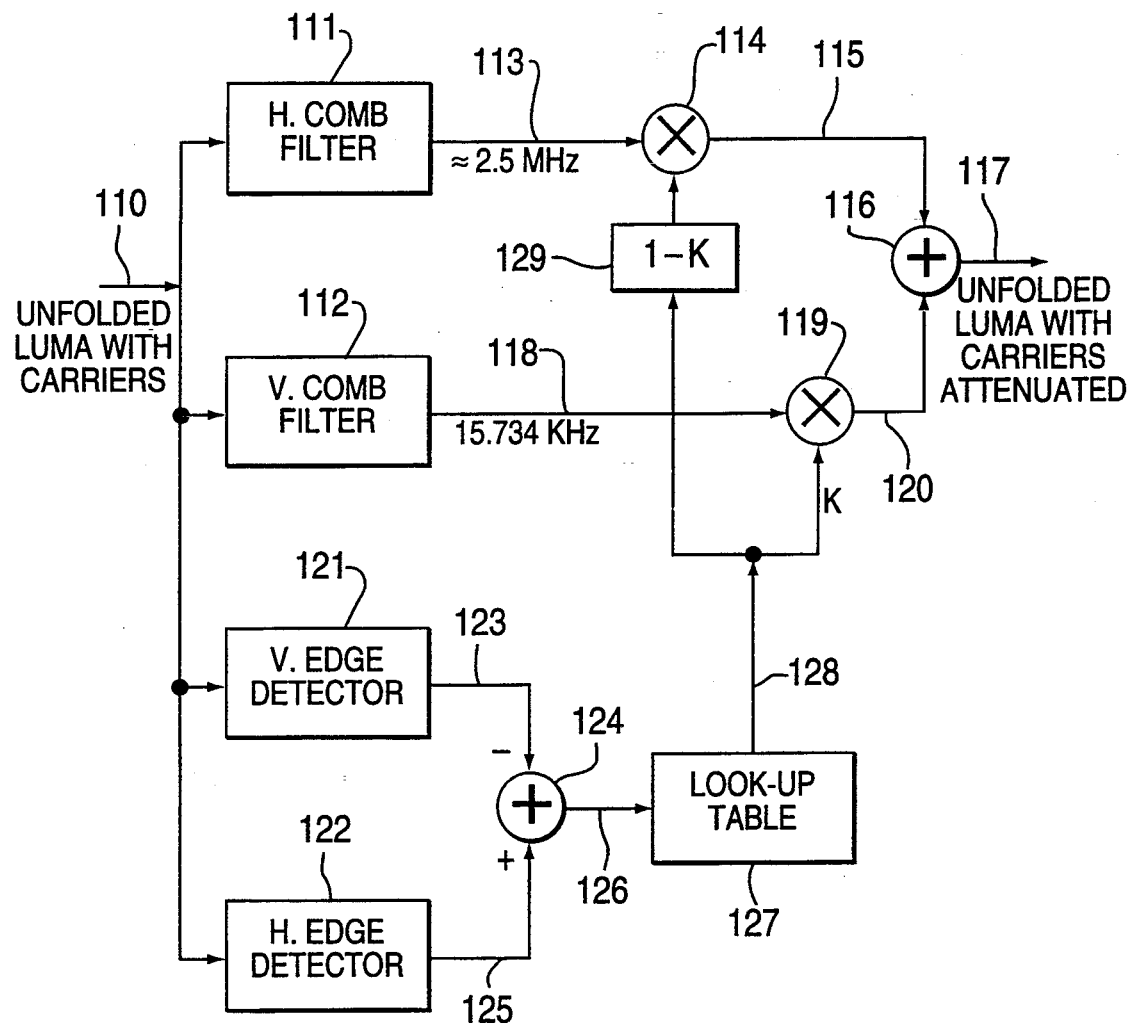
FIG. 2 is a detailed circuit diagram of the prefilter adapted in the motion signal detecting circuitry in FIG. 1.

Referring now to FIG. 2, equal amplitudes of the unfolded luminance signal on input line 110 are passed through the horizontal comb filter 111 and the vertical comb filter 112, and, unless affected by multipliers 114 and 119, equal amplitudes of the two signals are combined in adder 116 and the sum is available at the output 117. The horizontal comb filter 111 is designed to cancel the sidebands of the folding carrier at or above 2.5 MHz, and the vertical comb filter 112 is designed to cancel the line frequency of 15,714 Hz. However, the cancellations of the carrier and sidebands may be incomplete since they are affected by the brightness variations in the scanned picture.

Cancellations of the horizontal and vertical carriers on the output line 117 are achieved by the operation of the vertical scan edge detector 121 and the horizontal scan edge detector 122. When a "vertical" edge or discontinuity is detected during a vertical scan, a signal over line 123 and through subtracter 124 to the look-up table 127 causes a signal having a value of K over line 128 from look-up table 127 to increase the proportion of the output at 117 from the horizontal comb filter 111, whose output is not affected by the vertical edge, and decrease the proportion from the vertical comb filter 112. Likewise, when a "horizontal" edge is detected during a horizontal scan, a signal over line 125 and through subtracter 124 causes a signal having a value of K over line 128 both to increase the proportion of the output at 117 from the vertical comb filter 112 whose output is not affected by the horizontal edge, and decrease the proportion from the horizontal comb filter 111. In each case, the cancellation of carrier components is improved by increasing the output proportion from the comb filter whose output least affected by the brightness edge encountered.

In FIG. 1, the first frame delay device 20 delays by a period of one frame the unfolded luminance signal from which the folding carrier and sidebands are eliminated, and supplies it to the first subtracter 30 and the second frame delay device 21.

The second frame delay device 21 further delays the output of the first frame delay device 20 by a period of one more frame.

The first subtracter 30 subtracts the output of the first frame delay device 20 from the output of the prefilter 10, and generates the difference signal between frames of the unfolded luminance signal.

The second subtracter 31 subtracts the output of the second frame delay device 21 from the output of the prefilter 10 and generates the difference signal between alternate frames of the unfolded luminance signal.

Since the difference signal generated from the first subtracter 30 results in a sum signal between frames, due to the folding carrier remaining in the diagonal direction of the unfolded luminance signal without being completely eliminated by the prefilter 10, the image appears to move even if it does not actually move. Even if the folding carrier remains in the diagonal direction of the unfolded luminance signal without being completely eliminated by the prefilter 10, the difference signal between alternate frames, generated from the second subtracter 31, has the accurate difference value of the components between frames.

The first absolute value device 70 receives the difference signal between alternate frames of the unfolded luminance signal which is the output of the second subtracter 31 having positive or negative values according to the moving direction and the brightness of the video signal and changes it to a positive value.

The first threshold value detector 80 compares the output of the first absolute value device 70 with a predetermined threshold value, and generates the motion signal having a value of "1" for a larger signal than the predetermined threshold value, and a value of "0" for a smaller signal than the predetermined threshold value, or vice versa.

The first signal spreader 40 processes a motion signal based upon the difference signal between alternate frames of the unfolded luminance signal generated in the first threshold value detector 80 to be spread in both vertical and horizontal directions, and generates a motion signal based upon the difference signal between alternate frames of the spread, unfolded luminance signal. The first signal spreader 40 can be constructed in the same manual as the signal spreader described in the U.S. patent application entitled "A Control Signal Spreader", filed on May 31, 1990, by Ko. et al, which may be desirably comprised of the circuit as is shown in FIG. 3.

Figure 3:
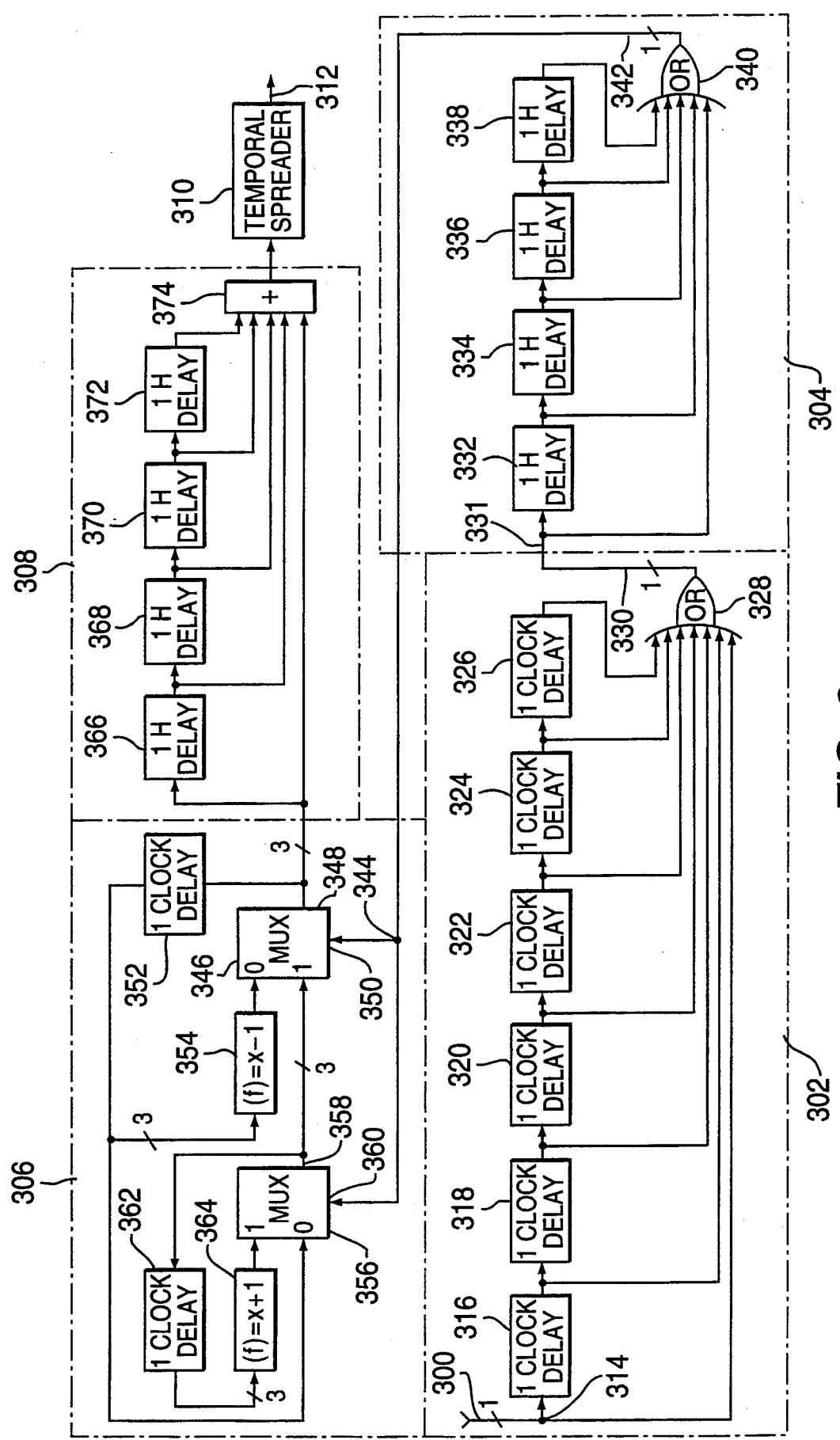
FIG. 3 is a detailed circuit diagram of the signal spreader adapted in the motion signal detecting circuitry in FIG. 1.

Referring now to FIG. 3, horizontal widener 302 has an input terminal 314 connected to a series of six clock delays 316 through 326. The output of an OR gate 328 is connected to an output terminal 330, and even inputs of the OR gate 328 are respectively connected to the input terminal 314 and the ends of the clock delays 316–326. Any motion signal having an amplitude of 1 indicating the presence of a phenomenon such as motion will be repeated six times at the output terminal 330.

Vertical widener 304 comprises four 1-H delays 332, 334, 336, and 338 connected in series to an input terminal 331 and OR gate 340 of which the output is connected to an output terminal 342 and five inputs are respectively connected to the input terminal 331 and the ends of the 1-H delays 332–338 that are remote from input terminal 331. Any line of motion signals applied to input terminal 331 will be repeated four times at output terminal 342.

The motion signals having the logic value of "0" pass through horizontal widener circuits 302 and vertical widener circuit 304 without delay, whereas the logic value of 1, indicating the presence of a phenomenon such as motion, is repeated so as to form a rectangle of logic "1's" that is seven clock cycles wide and five lines high.

The line signal spreader 306 is coupled to the output terminal 344 of the vertical widener 304 and functions to produce a ramp of increasing signal values along a line that increase from the value of "0" to a maximum, such as seven, during the first six motion signal periods preferred to. It then holds the maximum value as long as "1's" appear at the terminal 344, and when they cease, it produces a ramp of decreasing signal values along the line over a period of six clock cycles. This is done in the same way along the line whenever the motion signal assumes the logic value of "1", and along the four succeeding lines so that there are five identical lines.

For performing the line signal spreading function just described, a multiplexer MUX 346 has an output 348, a input labeled "0", and "1" may be applied. When a logic "0" is applied to the control input 350, the output 348 is connected to the input labeled "0", and when a logic "1" is applied to the input 350, the output 348 is connected to the input labeled "1". A one clock delay element 352 and a generator 354 that performs the function $f(x)=x-1$ are connected to series between output 348 and the input labeled "0". The generator 354 can not go below a value of "0". Thus, when no motion is detected and a logic "0" is at the input terminal 300, logic "0's" are passed through the widener circuits 302 and 304 to the terminal 344, and the output 348 of MUX 346 will be "0". If the signal at the output 348 of MUX 346 should be other than "0", it will be reduced to "0" in a maximum of four clock cycles by the operation of the generator 354. As will be seen, the MUX 346 will produce the ramp of decreasing values previously referred to.

The ramp of increasing values previously referred to is formed by MUX 356. It has an output 358 that is connected to the input of MUX 346 that is labeled 1, an input labeled 0, an input labeled 1 and a switching control input 360 to which logic values of "0" to "1" may be applied. As in the MUX 346, a logic "1" at the control input 360 connects the output 358 to the input labeled 1, and a logic "0" at the control 360 connects the output 358 to the input labeled 0. A one clock delay 362 and a generator 364 that performs the function $f(x)=x+1$ are connected to series between the output 358 and the input labeled 1. Generator 364 can not produce a signal value above some selected maximum, such as seven. The input of MUX 356 that is labeled 0 is coupled to output lead 348 of MUX 346.

For making the signal values for corresponding pixels along the scan lines available, the vertical signal spreader 308 comprise four 1-H delays 366, 368, 370 and 372 and an adder 374 for adding the output 348 and the output of the four 1-H delays 366 through 372.

Here, the motion signal values at the output 348 and at the ends of the four 1-H delays 366 through 372 that are remote from the output 348 could be respectively weighted before they are combined in the means for combining them, that is, an adder 374. Also, the temporal spreader 310 is suitably composed of a low-pass filter. It provides gradual transistors between still and motion portions of a scene in the temporal domain. The output of the temporal spreader 310 is supplied to the control switch 50 of FIG. 1 through an output line 312.

In FIG. 1, the control switch 50 allows the output of the first subtracter 30 to be transmitted to the input terminal of the second absolute value device 71 or to be blocked out therefrom according to the output of the first signal spreader 40. In more detail, the control switch 50 is used to operate logically in response to the output of the first subtracter 30 and the output of the first signal spreader 40, to eliminate the errors contained in the output of the first subtracter 30, because the control switch 50 connects the errors, by allowing the output of the first subtracter 30 to be transmitted to the second absolute value device 71 as the motion signal when the output signal of the signal spreader 40 is logically high (or low), that is, when the image is moved (or not moved).

The second absolute value device 71 converts the difference signal between frames of the unfolded luminance signal having both the positive and the negative values through the control switch 50 into only the positive signal.

In order to eliminate the minute noise components contained in the difference signal between frames of the unfolded luminance signal, the second threshold value detector 81 detects the difference signal, between frames of the luminance signal having the larger value than the predetermined threshold value among the output signals of the second absolute value device 71, and supplies the resultant difference signal to the second signal spreader 41.

The second signal spreader 41 spreads the difference signal, between the frames of the positive unfolded luminance signal inputted from the second threshold value detector 81 in the temporal, vertical and horizontal directions, and supplies the resultant spread difference signal, through an output line 15 to the control terminal of the soft switch (not shown) as the motion signal.

At this time, since the unfolded luminance signal has a phase difference of 180 degrees between frames due to the folding carrier, the difference signal between frames has a larger noise component than that of the difference signal between alternate frames. Accordingly, it is desirable that the predetermined threshold value of the first threshold value detector 80 is a larger value than the second threshold value detector 81.

Also, the spreading quantity of the first signal spreader 40 is set to be more than that, of the second signal spreader 41. That is, since the difference signal between alternate frames is detected later than that between frames, the actual motion between frames can not be followed. Accordingly, to compensate the above delayed detection, the spreading quantity of the difference signal between alternate frames is set to a larger value than the value between frames. The construction of and operation of the second signal spreader 41 is very similar to that of the first signal spreader 40 described above. Thus, a detailed description is omitted.

As described above, according to the present invention, by utilizing the property of the unfolded luminance signal having the same phase relationship in every other flame, the errors contained in the difference signal between the frames can be eliminated by the difference signal between alternate flames, so that the accurate motion signal, i.e., the difference component between frames of the unfolded luminance signals, can be accurately detected.

One skilled in the art will, by acquainting himself with the contents of the foregoing specification, be enabled to design other embodiments of the invention. For example, one skilled in the art will recognize that the cascade connection of an absolute value device and threshold value detector (such as 70 and 80, or such as 71 and 81) is an equivalent of an arrangement using a first comparator to threshold detect positive-swinging input signals swinging above a positive-valued threshold level, a second comparator to threshold detect negative-swinging input signals swinging below a negative-valued threshold level, and combinational logic such as an OR gate for combining the output responses of the first and second comparators. This should be borne in mind when construing the scope of the claims which follow, to offer protection both for the combinations of elements as specifically set forth and for their equivalents.

What is claimed is:

1. Apparatus for detecting motion in a video signal to generate a motion signal, said apparatus comprising:

first detecting means for detecting magnitudes of changes between a current value of said video signal and a first previous value of said video signal descriptive of a spatial location in a frame of said video signal two frames before a current frame that corresponds to a currently-scanned spatial location, and for generating a corresponding output signal descriptive of said magnitudes of changes between said current and first previous values of said video signal;

second detecting means for detecting at selected times magnitudes of changes between a current value of said video signal descriptive of a currently-scanned spatial location in a current frame of said video signal, and a second previous value of said video signal one frame before said current frame that corresponds to said currently-scanned spatial location, and for generating a corresponding output signal descriptive of said magnitudes of changes between said current and second previous values of said video signal;

electrically controlled switch means within said second detecting means, for selectively disabling the operation of said second detecting means and so causing the output signal of said second detecting means to assume a prescribed value;

means responsive to the output signal of said first detecting means for supplying a control signal; and means responsive to the output signal of said first detecting means, for supplying said motion signal.

2. Apparatus as set forth in claim 1, wherein said first detecting means comprises:

means for providing a first delayed signal by delaying said video signal for two frames of scan; and means for differentially responding to said video signal and said first delayed signal, to generate a differential response indicative of changes between said current and first previous values of said video signal.

3. Apparatus as set forth in claim 2, wherein said first detecting means further comprises:

a first absolute-value detector for generating the output signal of said first detecting means indicative of a magnitude of said differential response.

4. Apparatus as set forth in claim 2, further comprised of said means for supplying said control signal comprising:

first threshold detector means for generating an output having a first value when the output signal of said first detecting means has a magnitude larger than a threshold value and for otherwise generating said output having a second value; and first signal spreader means for generating said control signal, such that said electrically controlled switch means selectively disables the operation of said second detecting means only when said first threshold detector means generates said first value or when scanning of said video signal is descriptive of a spatial location in the frame of said video signal that is within a prescribed distance of any spatial location for which said first threshold detector means generates said first value.

5. Apparatus as set forth in claim 4, wherein said second detecting means comprises:

means for providing a second delayed signal by delaying said video signal for one frame of scan; and means for differentially responding to said video signal and second delayed signal, to generate a differential response indicative of changes between said current and second previous values of said video signal.

6. Apparatus as set forth in claim 5, wherein said second detecting means further comprises:

a second absolute-value detector for generating the output signal of said second detecting means indicative of the magnitude of said differential response.

7. Apparatus as set forth in claim 5, wherein said means for supplying said motion signal comprises:

second threshold detector means for generating a third value when the output signal of said second detecting means as selectively supplied to said second threshold detector via said electrically controlled switch means has a magnitude larger than a threshold value, and for otherwise generating a fourth value; and second signal spreader means for generating said motion signal, such that said motion signal indicates motion only when said second threshold detector means generates said first value of its output signal of when scanning of said video signal is descriptive of a spatial location in the frame of said video signal that is within a prescribed distance of any spatial location for which said second threshold detector means generates said third value.

8. Apparatus as set forth in claim 7, wherein:

said means for delaying said video signal for one flame of scan comprises a first frame delay device with an input port for receiving said video signal as delayed for one flame of scan, and wherein said means for delaying said video signal for two frames of scan comprises said first frame delay device and a second frame delay device with an input port connected for receiving said video signal as delayed for one flame of scan and with an output port for supplying said video signal as delayed for two frames of scan.

9. Apparatus as set forth in claim 5, wherein:

said means for delaying said video signal for one frame of scan comprises a first frame delay device with an input port for receiving said video signal and with an output port for supplying said video signal as delayed for one frame of scan, and wherein said means for delaying said video signal for two frames of scan comprises said first flame delay device and a second frame delay device with an input port connected for receiving said video signal as delayed for one frame of scan and with an output port for supplying said video signal as delayed for two frames of scan.

10. Apparatus as set forth in claim 1, wherein said second detecting means comprises:

means for providing a first delayed signal by delaying said video signal for one frame of scan; and means for differentially responding to said video signal and that said first delayed signal, to generate a differential response indicative of changes between said current and first previous values of said video signal.

11. Apparatus as set for in claim 10, wherein said second detecting means further comprises:

an absolute-value detector for generating the output signal of said second detecting means indicative of a magnitude of said differential response.

12. Apparatus as set forth in claim 10, wherein said means for supplying said motion signal comprises:

threshold detector means for generating an output having a first value when the output signal of said second detecting means as selectively supplied to said threshold detector via said electrically controlled switch means has a magnitude larger than a threshold value, and for otherwise generating a second value; and signal spreader means for generating said motion signal, such that said motion signal indicates motion only when said threshold detector generates said first value or when scanning of said video signal is descriptive of a spatial location in the frame of said video signal that is within a prescribed distance of any spatial location for which said threshold detector generates said first value.

* * * * *